United States Patent
Banks

[11] 3,808,465
[45] Apr. 30, 1974

[54] SIGNAL SOURCE

[76] Inventor: James R. Banks, RFD 2 Box 113, Lee, N.H. 03820

[22] Filed: Mar. 14, 1973

[21] Appl. No.: 340,973

[52] U.S. Cl. .................. 307/252, 307/260, 307/293
[51] Int. Cl. .......................................... H03k 17/00
[58] Field of Search... 307/260, 268, 252 N, 252 W, 307/293, 252 B; 328/155, 21, 28

[56] References Cited
UNITED STATES PATENTS

| | | | |
|---|---|---|---|
| 3,258,668 | 6/1966 | Milligan | 307/252 N |
| 2,410,721 | 11/1946 | Dome | 328/155 |
| 3,729,651 | 4/1973 | Fricker et al. | 307/252 N |
| 3,293,446 | 12/1966 | Baude | 307/260 |
| 2,902,655 | 9/1959 | Jones et al. | 307/260 |

Primary Examiner—Rudolph V. Rolinec
Assistant Examiner—B. P. Davis
Attorney, Agent, or Firm—Thomas N. Tarrant

[57] ABSTRACT

A waveform generator in which the primary of a transformer includes a nonlinear network so that when a sinusoidal source is connected, there is a notch in the voltage waveform at the primary winding, the notch having a complex function. The same notch appears at the secondary winding and is fed through a further network to three floating terminals at relatively different direct current levels for use with oscilloscopes for testing and instructing.

12 Claims, 4 Drawing Figures

PATENTED APR 30 1974  3,808,465

SIGNAL SOURCE

BACKGROUND OF THE INVENTION

1. Field of the Invention

The invention relates to waveform generators and particularly to those providing frequency, voltage level, and complex waveform information for use with oscilloscopes for training purposes and for test purposes.

2. Relation to the Prior Art

Function generators providing a multiplicity of waveforms are available, but ones providing any degree of flexibility in terms of complexity of waveforms are expensive and complex.

Most laboratory type oscilloscopes have some form of fixed frequency oscillators, usually providing a square wave or saw tooth waveform for voltage calibration. The frequency of such oscillators is sometimes adequate for a low tolerance frequency standard.

Outside of high cost test equipment or combinations of different equipment, there is no simple single source providing signals covering most of the performance range of laboratory oscilloscopes.

SUMMARY OF THE INVENTION

In accordance with the present invention an economical waveform generator is provided which may be operated from the usual 120 volt 60 hertz AC line to provide output waveforms at normally safe voltage levels and including periodic waveforms of sinusoidal, exponential and step function characteristics available at at least two different DC reference levels. The generator uses a transformer with a nonlinear network connected to its primary winding such that during a sinusoidal input, an impedance is connected in series with the winding at a predetermined point in the waveform to introduce a first discontinuity following which the impedance is abruptly shunted out of the circuit providing a second discontinuity in the nature of a step function.

The complex voltage waveform thus introduced in the transformer primary is reflected in the stepped down secondary of the transformer. The secondary winding of the transformer is connected to three floating terminals, one of which is partially unilaterally loaded for one voltage polarity, one of which is partially unilaterally loaded for the opposite voltage polarity and one of which is suited as a reference terminal. This provides output complex waveforms having opposite DC shifts. Thus, it is an object of the invention to provide a novel waveform generator.

It is a second object of the invention to provide a waveform generator in which an input sinusoidal waveform is distorted by a fixed notch introduced by a nonlinear network in the primary of the input transformer.

It is a further object of the invention to provide a waveform generator in which an input waveform to the primary of a transformer is distorted by a capacitor selectively shunted in and out of the input circuit to provide a notch in the waveform containing both exponential and step function curves.

It is still a further object of the invention to provide a simple waveform generator which provides two identical DC shifted periodic waveforms containing complex periodic discontinuities.

Further objects and features of the invention will become apparent upon reading the following description together with the drawing.

DESCRIPTION OF THE PREFERRED EMBODIMENTS

Figure 1:
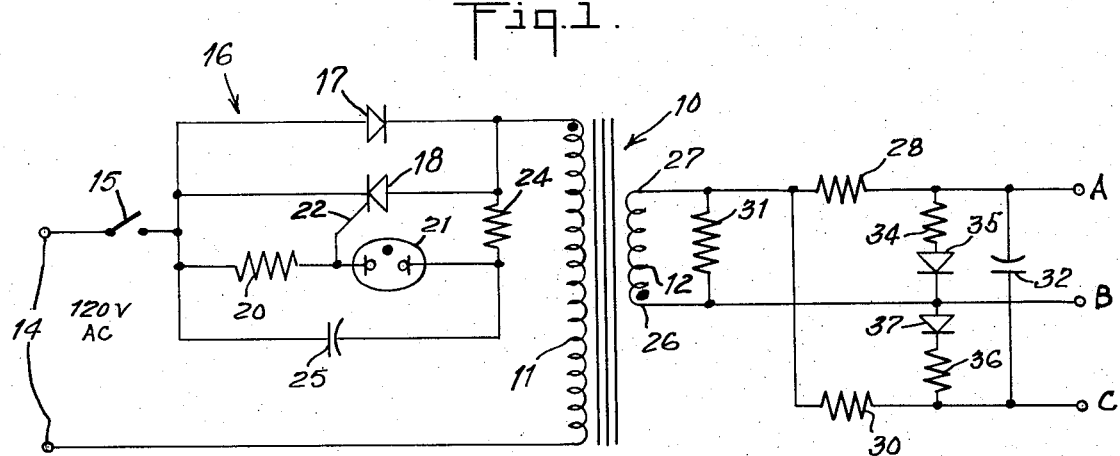
FIG. 1 is a schematic of a preferred embodiment of the inventive generator having a nonlinear network in the primary circuit of a transformer.

The waveform generator of the invention is preferably made with the addition of a few inexpensive components to a small and simple step down transformer of the type which is used, for example, for vacuum tube filaments. Transformer 10 thus may be designed for 120 volts and 60 hertz AC input to its primary 11 and may have a 10:1 step down ratio to provide 12 volts at its secondary 12. Input terminals 14 for connection to 120 volts AC line are followed by an on-off switch 15. One of terminals 14 connects to one end of primary winding 11 and the other one of terminals 14 connects to switch 15. Nonlinear network 16 is connected between switch 15 and the second end of winding 11. Nonlinear network 16 consists of four parallel branches each connected in series between switch 15 and primary winding 11. The first branch contains a unidirectional conductor depicted as diode 17 arranged with its cathode connected to winding 11 and its anode connected to switch 15. The second branch is a second unidirectional conductor depicted as SCR (silicon controlled rectifier) 18 having its anode connected to primary winding 11 and its cathode connected to switch 15 so that SCR 18 is polarized in the reverse direction from diode 17. The third branch is a resistor 20 and a fixed voltage firing device depicted as a neon bulb 21 connected in series with each other. It will be recognized that other fixed voltage firing devices such as, for example, a diac may be used. Gate 22 of SCR 18 is connected to the junction of resistor 20 and neon bulb 21. The fourth branch is a capacitor 25. Resistor 24 connecting the third and fourth parallel branches to winding 11 is a low resistance serving to reduce the peak current through SCR 18. It is considered herein as a conductor.

Secondary 12 of transformer 10 has a first end 26 connected to an output terminal B. The second end 27 of secondary winding 12 is connected through a first resistor 28 to output terminal A and through a second resistor 30 to output terminal C. Resistor 31 is connected directly between ends 26 and 27 of secondary 12 and is selected in relation to the inductive reactance of the transformer used to determine the phase angle between voltage and current in the transformer primary. The capacitor 32 is connected between terminals A and C to filter out voltage variations between these terminals.

Resistor 34 and diode 35 are connected in series between terminals A and B with diode 35 polarized such that its cathode is connected to terminal B. Resistor 36 and diode 37 are connected in series between terminals C and B with diode 37 polarized so that its anode is connected to terminal B.

The operation of the invention generator utilizes the fact that, due to the inductive reactance of a transformer, the voltage in the primary will lead the primary current by some phase angle. Considering first only the primary circuit, when a positive going sine wave is applied through switch 15, diode 17 will conduct with very small voltage drop and the remainder of the four branch network 16 will be inactive. Thus, the positive going half of the sine wave input will pass through primary winding 11 in a normal fashion. When the applied voltage sine wave passes through zero and reverses polarity, diode 17 will continue to conduct over the phase angle difference between voltage and current in the primary winding but will block as soon as the current reaches zero. At this point a voltage difference appears across capacitor 25 and capacitor 25 commences to charge, the more positive side being that one nearer to winding 11. As capacitor 25 charges, an increasing amount of the applied input voltage becomes dropped across diode 17 rather than across winding 11 producing an exponential discontinuity in the voltage waveform across winding 11. As the voltage across capacitor 25 and diode 17 increases, neon bulb 21 reaches its firing potential and triggers SCR 18. With SCR 18 triggered, switch 15 is again connected through a very low resistance conductive path to winding 11 resulting in a step function in the voltage waveform across winding 11 running it abruptly to conformance with the input voltage. Capacitor 25 discharges through SCR 18 with resistor 24 acting to prevent the discharge current from exceeding the ratings of SCR 18. The 180° phase reversal produced by transformer 10 will position the discontinuities in the positive going half of the output sine wave.

Figure 2:
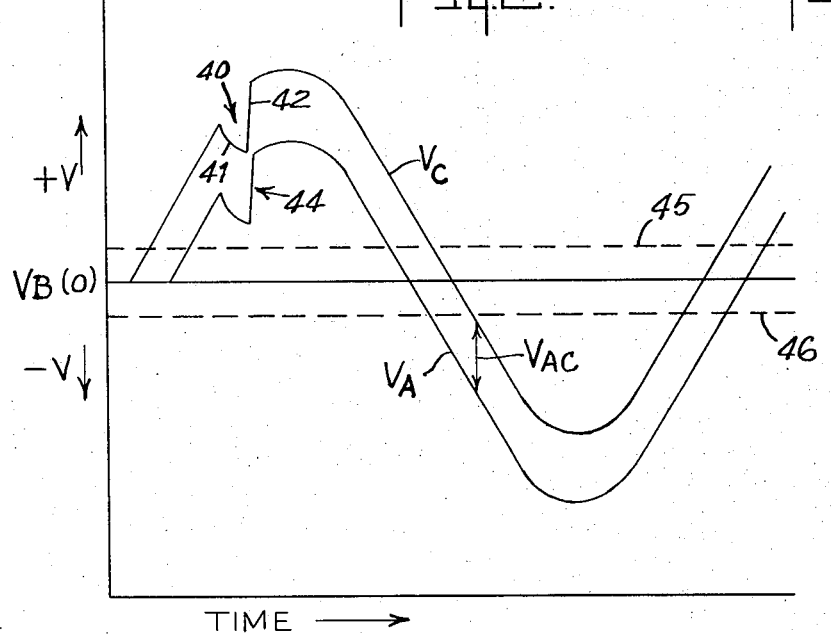
FIG. 2 is a graphical representation of the output signals from the generator of FIG. 1.

It will be seen that the discontinuities produced by shunting capacitor 25 in and out of the circuit must be above the reference level of the input sine wave. As has been stated, this is obtained due to the lag of current with respect to voltage in transformer 10. As is well known, resistive loading will change this phase angle and resistor 31 across the secondary winding is used to adjust the phase angle to position the discontinuity in the waveform. The impedance of primary winding 11 and the size of capacitor 25 and the firing voltage of bulb 21 determine the size of the discontinuity, which preferably is determined to appear as the notch depicted in FIG. 2. It will be recognized that other types of impedances may be substituted for capacitor 25 to change the configuration of the discontinuities.

Diode 35 conducts during the positive portion of the waveform appearing at end 27 of transformer 12 dropping some of the voltage across resistor 28 and biasing the output appearing at terminal A in the negative direction relative to terminal B. Diode 37 performs the same action during the negative portion of the waveform appearing at end 27 of winding 12 so that the waveform appearing at terminal C is biased in the positive direction relative to terminal B. Thus in FIG. 2 terminal B is arbitrarily selected as the reference terminal and the voltage at terminal B designated by the line $V_B$ is arbitrarily set as 0. $V_A$ is then the voltage signal appearing at terminal A and $V_C$ is the voltage signal appearing at terminal C when a sine wave is applied at terminals 14. The form of the discontinuities is depicted by notch 40 in signal $V_C$ with an exponential curve 41 and a step function 42. An identical discontinuity in signal $V_A$ is designated 44. The waveform of signal $V_C$ displays a positive DC shift to center around dashed line 45 while the waveform of signal $V_A$ displays a negative DC shift to center around dashed line 46.

The voltage appearing between terminals A and C is a constant equal to the algebraic sum of the DC shifts, also equal to the vertical displacement between the signals $V_A$ and $V_C$ at any point and depicted as $V_{A-C}$.

Figure 3:
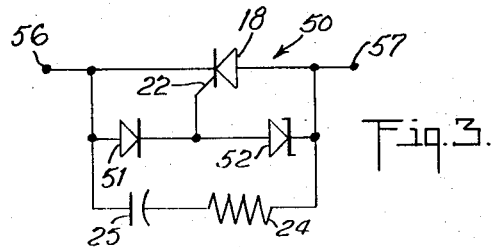
FIG. 3 is a schematic of a second embodiment of the nonlinear network of FIG. 1.
Figure 4:
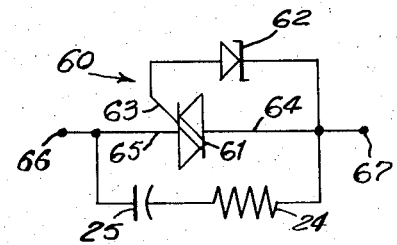
FIG. 4 is a schematic of a third embodiment of the nonlinear network of FIG. 1.

FIGS. 3 and 4 illustrate additional embodiments of nonlinear network 16. Identically corresponding parts are given the same number designation in FIGS. 3 and 4 as in FIG. 1. A number of different embodiments of nonlinear network 16 can be used with the same results or with some range of modified results still serving the same purpose and still within the general scope of the invention. For example, various other thyristor devices can be used instead of SCR 18 and there is a considerable range of devices and methods suitable for triggering the thyristor devices with the same or similar results to those obtained in the circuit of FIG. 1.

In FIG. 3, nonlinear network 50 has SCR 18, capacitor 25 and resistor 24 represented as identical to the same numbered parts in FIG. 1. However, diode 17 and the parts for triggering SCR 18 are replaced by diode 51 and zener diode 52 connected in series with each other and in parallel with SCR 18 across its cathode-anode electrodes. Zener diode 52 is connected with its anode to gate 22 and its cathode connected to the anode of SCR 18. Diode 51 is connected with its cathode to gate 22 and its anode connected to the cathode of SCR 18. Terminal 56 connected to the cathode of SCR 18 would be connected to switch 15 in FIG. 1 while terminal 57 connected to the anode of SCR 18 would be connected to the upper end of winding 11 in FIG. 1.

Diodes 51 and 52 together provide the unidirectional conductive path provided by diode 17 of FIG. 1. Zener diode 52 acts as a trigger in the reverse direction operating to trigger SCR 18 when the zener voltage is exceeded.

FIG. 4 depicts nonlinear network 60 in which bidirectional triode thyristor, namely triac 61, is used instead of reverse blocking triode thyristor or SCR 18 of FIG. 1. Zener diode 62 has its anode connected to gate electrode 63 of triac 61. The cathode of diode 62 is connected to electrode 64 (T2) of triac 61. Electrode 65 (T1) of triac 61 is connected to terminal 66 which in FIG. 1 would be connected to switch 15. Electrode 64 of triac 61 is connected to terminal 67 which in FIG. 1 would be connected to the upper end of winding 11. As in FIG. 1, capacitor 25 and resistor 24 are connected in series with each other and in parallel with the thyristor.

In FIG. 4, when an applied waveform forward biases diode 62 triac 61 is triggered into conduction and provides a low impedance path. When the applied waveform reverse biases diode 62, triac 61 goes out of conduction upon cessation of current flow and is nonconductive until the zener potential of diode 62 is exceeded again triggering triac 61.

It will be seen that balanced bilateral triggering devices such as neon bulb 21 or diac could be employed in a circuit similar to FIG. 4 to provide notches in both positive and negative portions of the generated waveform if such were to be desired. Integrated circuit technology has also produced thyristors with built-in triggering devices. For example, triacs are becoming available with integrated diacs and it's contemplated that devices of this nature can be utilized in accordance with the invention to reduce the number of components as well as assembly costs.

While the invention has been described with relation to a specific embodiment, a number of alternatives and modifications are contemplated as within the invention. For example, while the inventive generator has been described as an independent unit, it may easily be built into an oscilloscope. Built into an oscilloscope, the input voltage could be a lower voltage from another transformer and little or no step down might be necessary in transformer 21.

While transformer 21 simultaneously provides the advantages of electrical isolation, voltage step down and phase shift between voltage and current, the phase shift factor is the more critical in the present invention. Where isolation is unimportant as, for example in the above instance where the inventive circuit is installed inside an oscilloscope, an inductor having only one coil can readily be used with both the input and output circuits described connected to the same terminals of the one winding. Obviously step down can be obtained with one winding by utilizing a tap for the output circuit. The term "inductors" is used herein as generic to transformers and coils generally.

It is also to be understood that a reversal of the complete nonlinear network will only displace the notch 180° along the input waveform. While designed primarily as a test device and instructional aid for use with oscilloscopes, the inventive generator is also useful in testing the response of various circuits and apparatus to the types of wave functions generated. Thus it is intended to cover the invention within the full scope of the appended claims.

I claim:

1. A signal source for providing complex waveforms from s sinusoidal input comprising:
    a. An inductor;
    b. A nonlinear network connected in series with a winding of said inductor and comprising:
        1. A first unidirectional conductor,
        2. A triggered second unidirectional conductor;
        3. An impedance connected mutually in parallel with the cathode-anode electrodes of the two unidirectional conductors, said two unidirectional conductors polarized in opposite directions; and,
        4. Means to trigger said second unidirectional conductor at a delayed time interval after an applied sinusoidal waveform reverse biases said first unidirectional conductor, whereby on the application of a sinusoidal input said impedance is selectively shunted in and out of the circuit introducing discontinuities to the waveform; and,
    c. An output network coupled to said inductor and having output terminals providing said complex waveforms.

2. A signal according to claim 1 wherein said impedance is a capacitor.

3. A signal source according to claim 1 wherein said first unidirectional conductor is a semiconductor diode and said second unidirectional conductor is a silicon controlled rectifier.

4. A signal source according to claim 3 wherein said means to trigger comprises a triggering device connected in a further parallel branch of said nonlinear network and to said silicon controlled rectifier for triggering said rectifier at a predetermined point in an applied waveform.

5. A signal source according to claim 1 wherein a further secondary winding of said inductor is shunted by an impedance for predetermining the phase shift between voltage and current in said primary winding and thereby determine the position of said discontinuities relative to the applied waveform.

6. A signal source according to claim 1 wherein said output network is coupled to said inductor by a further secondary winding having a first lead connected directly to a first output terminal and a second lead, the second lead being connected both to a second output terminal through a first resistor and to a third output terminal through a second resistor, said second and third output terminals each connected to said first output terminal through a respective unidirectional load.

7. A waveform generator characterized in that it generates an output notched sine wave from an input sine wave, said generator comprising:
    a. First and second input terminals for connection to a sinusoidal source;
    b. a transformer having a primary winding and a secondary winding, said primary winding having a first end and a second end;
    c. means to connect said first end to said first input terminal;
    d. a nonlinear network connected between said second end and said second input terminal and comprising:
        1. A first branch containing a thyristor in series with said primary winding;
        2. A second branch directly in parallel with said first branch and containing an impedance; and,
        3. A device for triggering said thyristor at a delayed time interval after an applied sine wave reverses the bias on said thyristor in at least one direction.

8. A waveform generator according to claim 7 wherein said nonlinear network further comprises a third branch directly in parallel with said first branch and containing a second unidirectional device, said thyristor being a first unidirectional device polarized opposite to said second unidirectional device.

9. A waveform generator according to claim 8 wherein said third branch contains a zener diode connected in series with said second unidirectional device as said device for triggering said thyristor.

10. A waveform generator according to claim 7 wherein said thyristor is a triac and said device for triggering is a diode connected between two electrodes of the triac.

11. A waveform generator characterized in that it generates from an input sine wave an output notched complex periodic waveform said generator comprising:
    a. A transformer having a primary winding and a secondary winding;
    b. a nonlinear network connected to said primary winding for generating said notch in an applied sine wave;
    c. a first output terminal connected to a first tap of said secondary winding;

d. a second output terminal resistively connected to a second tap of said secondary winding;

e. a third output terminal resistively connected to said second tap;

f. a first unilateral load connected between said second terminal and first terminal polarized in a given direction;

g. a second unilateral load connected between said third terminal and said first terminal polarized in the opposite direction whereby the output waveform between the first and second terminals has a DC shift in one direction and the output waveform between the first and third terminals has a DC shift in the opposite direction.

12. A waveform generator according to claim 11 wherein a capacitor is connected between said second and third terminals whereby the voltage therebetween is held substantially constant.

* * * * *